(12) United States Patent
Thore et al.

(10) Patent No.: US 10,705,235 B2
(45) Date of Patent: Jul. 7, 2020

(54) METHOD OF CHARACTERISING A SUBSURFACE VOLUME

(71) Applicant: Total SA, Courbevoie (FR)

(72) Inventors: Pierre Thore, Pau (FR); Pierre Bergey, Saint Germain en Laye (FR)

(73) Assignee: Total SA, Courbevoie (FR)

( * ) Notice: Subject to any disclaimer, the term of this patent is extended or adjusted under 35 U.S.C. 154(b) by 628 days.

(21) Appl. No.: 15/506,851

(22) PCT Filed: Aug. 26, 2015

(86) PCT No.: PCT/EP2015/069567
§ 371 (c)(1),
(2) Date: Feb. 27, 2017

(87) PCT Pub. No.: WO2016/030432
PCT Pub. Date: Mar. 3, 2016

(65) Prior Publication Data
US 2017/0248718 A1  Aug. 31, 2017

(30) Foreign Application Priority Data
Aug. 29, 2014 (GB) .................................. 1415336.5

(51) Int. Cl.
*G01V 11/00* (2006.01)
*G01V 1/30* (2006.01)
*G01V 99/00* (2009.01)

(52) U.S. Cl.
CPC .............. *G01V 1/301* (2013.01); *G01V 1/305* (2013.01); *G01V 11/00* (2013.01); *G01V 99/005* (2013.01);
(Continued)

(58) Field of Classification Search
CPC ...... G01V 11/00; G01V 11/30; G01V 11/301; G01V 11/305; G01V 99/005; G01V 2210/66; G01V 2210/6222; G06F 17/5009
See application file for complete search history.

(56) References Cited

U.S. PATENT DOCUMENTS

2012/0150501 A1   6/2012  Wu
2013/0081808 A1*  4/2013  Zeidani .................. C09K 8/592
                                              166/272.4

FOREIGN PATENT DOCUMENTS

EP   2098887 A1   9/2009
GB   2421822 A    7/2006
(Continued)

OTHER PUBLICATIONS

Vollmer, Thorsten, "International Search Report," prepared for PCT/EP2015/069567, dated Dec. 11, 2015, five pages.
(Continued)

*Primary Examiner* — Gregory J Toatley, Jr.
*Assistant Examiner* — Lynda Dinh
(74) *Attorney, Agent, or Firm* — Ross T. Robinson

(57) ABSTRACT

Disclosed is a method of characterizing a subsurface volume. The method comprises: extracting a geobody from seismic data arranged within a discretized volume comprising a plurality of cells, the geobody comprising a subset of the plurality of cells, each cell of the subset having one or more properties indicative of a particular fluid phase. The extraction of the geobody comprises: determining a propagation probability value for each cell indicative of the probability that a front will propagate through the cell; beginning from a source within the discretized volume, using the propagation probability value to calculate a traveltime for each cell, the travel time describing the time the
(Continued)

front takes to travel from the source point to the cell; and using the traveltimes to extract the geobody from the seismic data.

16 Claims, 2 Drawing Sheets

(52) U.S. Cl.
CPC .......... *G01V 2210/626* (2013.01); *G01V 2210/6222* (2013.01)

(56) References Cited

FOREIGN PATENT DOCUMENTS

WO    WO-2006127151 A1    11/2006
WO    WO-2009082563 A1    7/2009

OTHER PUBLICATIONS

Jbabdi, S., et al., "Accurate Anisotropic Fast Marching for Diffusion-Based Geodesic Tractography," International Journal of Biomedical Imaging, vol. 2008, Article ID 320195, Jan. 2008, 12 pages.

* cited by examiner

METHOD OF CHARACTERISING A SUBSURFACE VOLUME

TECHNICAL FIELD

The present disclosure relates to methods of characterizing a subsurface volume, and in particular to extracting a geobody from seismic data.

BACKGROUND

The typical process to establish oil and gas production forecasts includes the construction of 3D subsurface models and flow simulation using such models as an input.

Subsurface models may comprise, for example, reservoir flow, basin, and geo-mechanical models. These comprise gridded 3D representations of the subsurface used as inputs to a simulator allowing the prediction and real time monitoring of a range of physical properties as a function of controlled or un-controlled boundary conditions:

Reservoir flow models aim to predict fluid flow properties, primarily multi-phase rates (and composition), pressure and temperature, under oil and gas field or aquifer development scenarios.

Basin models aim to predict over time the types of hydrocarbon being generated out of kerogen, and the location of hydrocarbon trapping at geological timescales.

Geo-mechanical models aim to predict stress and stress related phenomenon such as heave/subsidence or failure in natural conditions or under oil and gas or aquifer development conditions.

Subsurface models are often generated using geo-statistical methods. Such models often include high level, discrete parameters which are variables that condition/control a number of lower order continuous parameters/variables. Discrete high level variables are typically used in subsurface modelling to capture geological heterogeneities of critical importance to the overall process. Discrete geological 3D parameters (e.g. facies, architectural elements) often display complex 3D relationships.

A geobody is a group of cells having similar properties which indicate the presence of a particular fluid phase. Typically they have been identified or extracted by comparing, on an individual cell basis, the relevant cell property or properties to a threshold.

However, the present methods have a number of drawbacks. The core method does not necessarily favour contiguous groups of cells, and separate non-contiguous groups may be identified as part of the geobody based upon the threshold comparison. Present methods also cannot ensure that a volume criteria is reached without performing the entire method and calculating the resultant volume. Should the volume be insufficient, the method needs to be performed again with new thresholds.

It would be desirable to provide for an improved method of geobody extraction.

SUMMARY OF INVENTION

In a first aspect of the invention there is provided a method of characterizing a subsurface volume, said method comprising extracting a geobody from seismic data arranged within a discretized volume comprising a plurality of cells, said geobody comprising a subset of said plurality of cells, each cell of said subset having one or more properties indicative of a particular fluid phase, wherein said extracting a geobody comprises:

determining a propagation probability value for each cell indicative of the probability that a front will propagate through said cell;

beginning from a source within said discretized volume, using the propagation probability value to calculate a traveltime for each cell, said travel time describing the time said front takes to travel from said source point to said cell; and using said traveltimes to extract said geobody from said seismic data.

Other aspects of the invention comprise a computer program comprising computer readable instructions which, when run on suitable computer apparatus, cause the computer apparatus to perform the method of the first aspect; and an apparatus specifically adapted to carry out all the steps of any of the method of the first aspect.

Other non-essential features of the invention are as claimed in the appended dependent claims.

BRIEF DESCRIPTION OF THE DRAWINGS

Embodiments of the invention will now be described, by way of example only, by reference to the accompanying drawings, in which.

DETAILED DESCRIPTION OF THE EMBODIMENTS

This disclosure relates to the extraction of "geobodies" from 4D seismic data. In this problem, a search is performed, within a given 3D discretized space (grid or voxet) for a group of cells/voxels having a similar property or properties indicative of the presence of a particular fluid phase. This group of cells, referred to herein as a geobody, is preferably contiguous and preferably in the vicinity of a pre-defined source location (well/aquifer/gas cap). In some cases, the geobody will comprise a pre-defined total volume.

A geobody extraction method may comprise the following steps:

1. A condition associating a threshold and an ordering logic is defined for each property indicative of the presence of the desired fluid phase. The condition for all properties is tested simultaneously for every cell/voxel of the 3D space. Cells where the conditions are not met are not further considered for inclusion in the geobody. For example: a cell may belong to the geobody if 3D property A at the considered cell is below threshold X and if 3D property B at the considered cell is above threshold Y.

Note that the condition can include properties such as distance to a predefined source location.

2. The cells that are still considered for inclusion in the geobody are split into groups of contiguous cells.

3. Optionally, some groups of contiguous cells below a certain total volume (or number of cells) threshold are excluded from the geobody.

4. The group(s) which include a source location are included in the geobody.

5. Optionally, groups of contiguous cells not including a source location are added to the geobody, based on human operator input.

6. The geobody volume is computed by integration of cell volumes over cells belonging to the geobody. If the resulting volume is not in the desired volume range, the process re-iterated from steps 1 to 5 (human operator decision) revising parameters such as the thresholds used in step 1.

Figure 1:
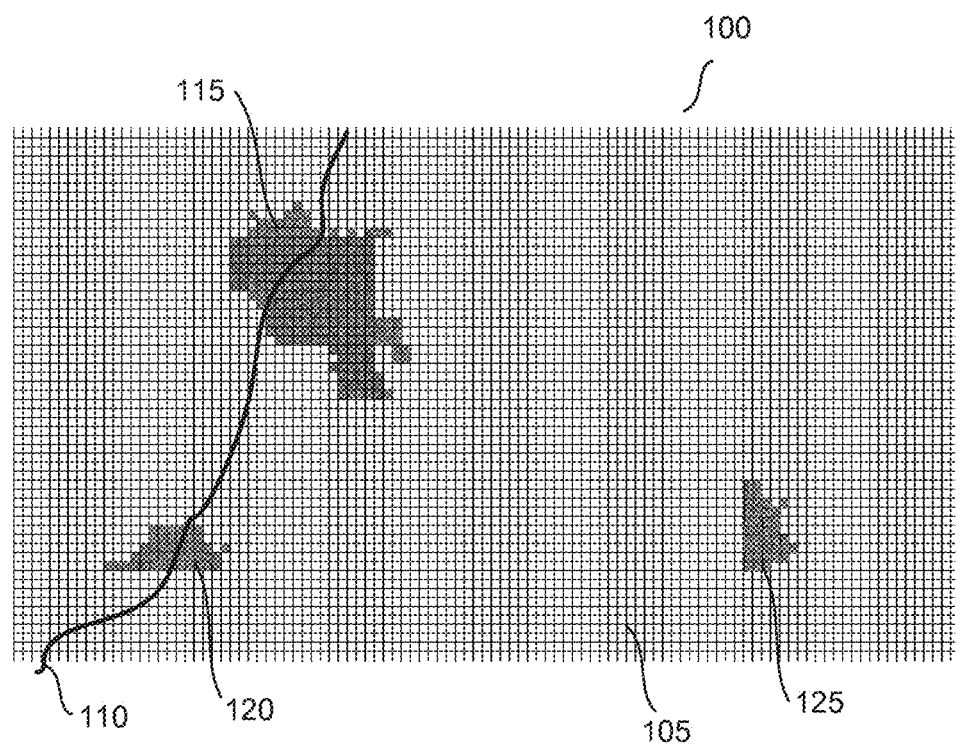
FIG. 1 comprises a 2D representation of discretized volume showing a geobody.

FIG. 1 illustrates example results of such a method. Shown is a discretized volume or grid 100 (here represented in 2D for simplicity) comprising a number of cells 105. The grid 100 illustrated here is regular, although this is not important and irregular grids may equally be used. Also shown is well path 110 (source location).

Each cell 105 will have attributed thereto one or more values relating to one or more properties. In the specific example here, each cell may have attributed thereto values for property A and for property B. Cells which meet the condition for inclusion in the geobody according to step 1, above, are shown shaded. Cells which do not meet the condition for inclusion in the geobody according to step 1 are shown unshaded. The result is three separate groups of contiguous cells 115, 120, 125.

In step 3, it may be that a smaller group or groups are excluded for the geobody. This may include groups 120, 125 in this example.

In step 4 it may be that groups 115, 120 are included in the geobody (if not already excluded in step 3) as they each include a source location; each of these groups lying on well path 110. In step 5 it is decided whether group 125 is to be included, despite it not including a source location, being remote from well position 110. Once this is done, the geobody volume can be calculated. If considered too small, the thresholds can be changed. This may mean that one or more of groups 115, 120, 125 grow in size and/or new groups are included.

Such a method is very easily understood by a human operator. However, it suffers from several drawbacks, which include:

The preference for vicinity to a source location is factored using a simple distance cut-off as opposed to a combination with the indicative property or properties. The workflow does not allow automatic growth of the body based upon proximity of additional group of cells to current group of cells.

The workflow does not ensure that the geobody selected in a single iteration meets any a priori volume criteria, without operator intervention.

The workflow does not relate to any strong physical inversion setup.

To address these drawbacks it is proposed to identify an extension of a contiguous domain of pre-defined volume from a pre-defined source over a 3D discretized space.

To achieve this, it is proposed to include the concept of front propagation into geobody extraction. Considering the example of injected water, where water is injected into the well and propagates away from it, the indicator of the presence of water is an increase of P-velocity (a positive 4D anomaly). This anomaly should be more likely to indicate the presence of water if it is high in value and is connected to the well position. Therefore a body expansion could be used to compute the geobody if the signal was perfect. However the signal is not perfect and the presence of noise means that it is not preferable to use the property as a simple black or white indicator for the propagation. It is more convenient to transform the 4D property into a probability (where a high positive anomaly has a high probability), which may be used as a velocity (the higher the anomaly the higher the velocity) for front propagation in a fast marching algorithm. In addition to the 4D property criterion, it is possible to add some prior knowledge regarding the propagation e.g. as flows tend to remain within layers, horizontal propagation is more likely than vertical propagation. By combining all this information, it is possible to obtain a velocity or slowness (possibly anisotropic), from which a time of arrival from the source to each position of the volume can be computed (traveltime). The different geobodies can then be extracted as being defined by iso-surfaces of constant traveltime (isochrones).

Described below is a specific example of a method for including front propagation into geobody extraction. The inputs for the method are as follows:

A 3D volume, discretized into a plurality of cells or voxels;

A source geometry description which may take the form of an indicator of the presence of a source over the 3D discretized space: this may be used as an initial geobody which can be reduced to a point or "seed" and from which the final geobody is expanded or "grown"; the source can correspond to a single or several distinct locations, derived (for example) from the location of perforation(s), well(s), fluid contact(s) (aquifer or gas cap) or other information;

One or more indicator properties (over the 3D discretized space) indicative of whether or not a given cell is likely to be part of the geobody;

Optionally, a 3D volume fraction property (variable or constant) expressed over the 3D grid space; the volume fraction property to be considered depends on the type of problem being handled. For 4D seismic geobody extraction, it may refer to the ratio between gross rock volume and net sweepable pore volume;

Optionally, a target volume specific to the source being treated. By way of example, in 4D seismic geobody extraction, the total sum of injected water may be known for a well or group of wells and therefore can be used as the target volume. Also, for a closed well test problem, a well test may have provided an estimate of finite connected porous volume;

Parameters and operations specific to the transformations detailed in step 1 of the method below.

Main steps of the method may comprise the following:

1. Transform the indicator property, indicative of whether or not a given cell is likely to be part of the geobody, into a positive propagation probability value. The propagation probability value can be used as a velocity or slowness (where slowness is the reciprocal of velocity) for each cell. The velocity/slowness may be anisotropic. Where more than one property are being used as indicators, then these indicators may be combined during this step.

The velocity/slowness may be derived using inter alia one or more of the following considerations as a property indicator:

Prior geological knowledge (e.g. cells of porous volume fraction);

Prior reservoir flow knowledge (e.g. prior simulated front probability location);

4D seismic inversion knowledge (e.g. 4D indicator dV/V (change in velocity) from inversion);

Petro Elastic Model knowledge (e.g. inverted saturation);

Coherency analysis across knowledge sources (e.g. seismic inversion vs. simulation forecast).

The combination and transform can be calculated by human analysis of the specific problem or from more general physical laws. The transformation may be performed using a transfer function, which may take the form of a linear or non-linear mathematical or logical formula(e). In the following, it is assumed than the transformation results, for each cell, in a property of anisotropic propagation probability valued between 0 and 1.

2. Using the source indicator as source term and the previously computed probability as velocity, compute a time to source. The computation of the time to source may be computed using a fast marching method. In an embodiment, an anisotropic fast marching method may be used, such as that disclosed in "Accurate Anisotropic Fast Marching for Diffusion-Based Geodesic Tractography" S. Jbabdi et al. which is incorporated herein by reference. Alternatively an isotropic Fast Marching Method can be used with an isotropic velocity input.

The general idea of the fast-marching algorithm is a direct extension of Dijkstra's algorithm for finding minimal paths in a graph. Suppose that the time of arrival is known inside a close set of grid cells (the known set). Then, the first cells that will be encountered by the propagating front are the cells on the edge of the known set (the trial set). The first cell which will be encountered by the propagating front is the closest one to known (in terms of geodesic distance), and, there will be no other way to make this distance smaller after propagating the front further. This means that the arrival time at this cell will not change, and can be frozen. Where the distance between the front and the neighbouring cells in the trial set is anisotropic, the anisotropy needs to be accounted for. This can be achieved by considering a set of simplexes (triangles) that cover the whole neighbourhood around a trial cell, and minimise the distance function between the simplexes and that cell. The introduction of these simplexes allows description of the trajectories on a continuous rather than a discrete grid.

The grid in which the fast marching algorithm is performed can be any kind of grid for example: a reservoir grid, a hybrid grid (for example as described in patent application GB2421822A, herein incorporated by reference), or a seismic grid. The obtained geobodies are 3D shapes which are fairly independent of the grid on which they have been computed (the sole possible difference being the resolution due to size of the cells). Consequently the Geobodies can be transferred between different kinds of grid.

3. Either:
  a. Extract geobody by computing an isochrone from the computed volume; or
  b. Extract geobody of specific volume by the following method:
    i. Sort cells according to their time to source (traveltime)
    ii. Cumulate the product of cell volume by the cell volume fraction property from low to high time to source until reaching the target geobody volume. The geobody is defined by the combination of source cells and any cell with a time to source lower than the time to source necessary for the cumulated volume to reach the targeted volume. The cell volume fraction property for each cell may be obtained from a corresponding reservoir grid, and may comprise the one or more of the following factors: net-to-gross NTG, the porosity $\Phi$ and water saturation $s_w$.

It should be noted that throughout this description, the term volume may refer equally to gross rock volume, net rock volume, pore volume, sweepable pore volume, etc. The difference between those concepts is irrelevant to the overall workflow beyond the need for different volume related input information in the form of a 3D volume fraction property.

Figure 2:
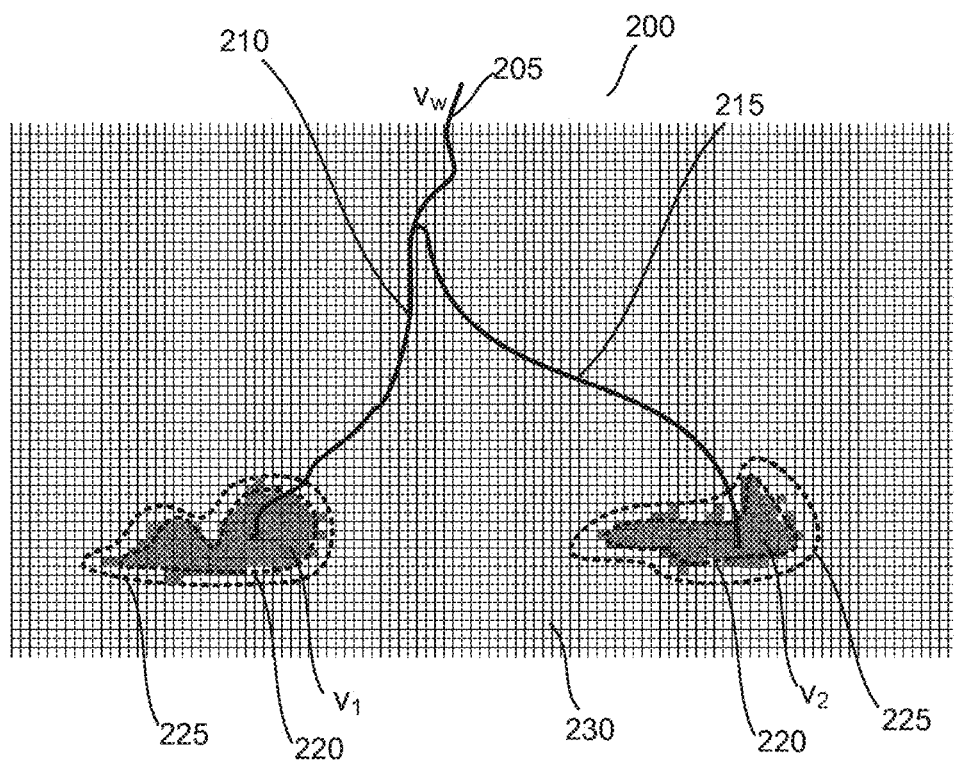
FIG. 2 comprises a further 2D representation of discretized volume showing a geobody following the injection of a fluid.

A specific example will now be described with reference to FIGS. 2 and 3. FIG. 2 shows a 2D representation 200 of a discretized volume. The volume comprises a well system 205 with two paths 210, 215. The well system is injected with a known volume of water $v_w$. A proportion of the injected water follows the first of the paths 210 and the remainder of the injected water follows the second of the paths 215. In either case, the water enters permeable layers resulting in water saturated subsurface volumes $v_1$ and $v_2$. The ratio of volume $v_1$ to volume $v_2$ is unknown. Note that the saturated volumes tend to be horizontal in form as the injected water tends to remain within a layer.

The saturation of the saturated volumes causes certain measurable indicator properties to change in value. These indicator properties can therefore be measured and will be indicative of the presence or absence of the injected water. In this simplified example, one property which may be considered is the relative impedance variation obtained from 4D seismic data.

The relative impedance variation is transformed into a slowness via a transfer function. FIG. 2 shows dotted lines 220, 225 representing volumes of cells having high and intermediate relative impedance variation. Cells within the inner dotted lines 220 are those mostly having a high relative impedance variation value. The cells between the inner dotted lines 220 and outer dotted lines 225 are cells mostly having an intermediate relative impedance variation value, and the remaining cells 230 mostly have a low, negative or null relative impedance variation value. The presence of noise means that there will be, for example, some cells outside the outer dotted lines having an intermediate or high relative impedance variation value. The transfer function will, in this simplistic example, assign to each of the cells having a high relative impedance variation value, a very low slowness value. The transfer function may then assign to each of the cells having an intermediate impedance value, an intermediate slowness value and assign to each of the cells having a low impedance value, a very high slowness value. The very high slowness value may be many orders of magnitude greater than the very low and intermediate slowness values.

Of course, as described already, the transfer function may be more complex, take a completely different form and/or use a combination of different indicator properties.

Figure 3:
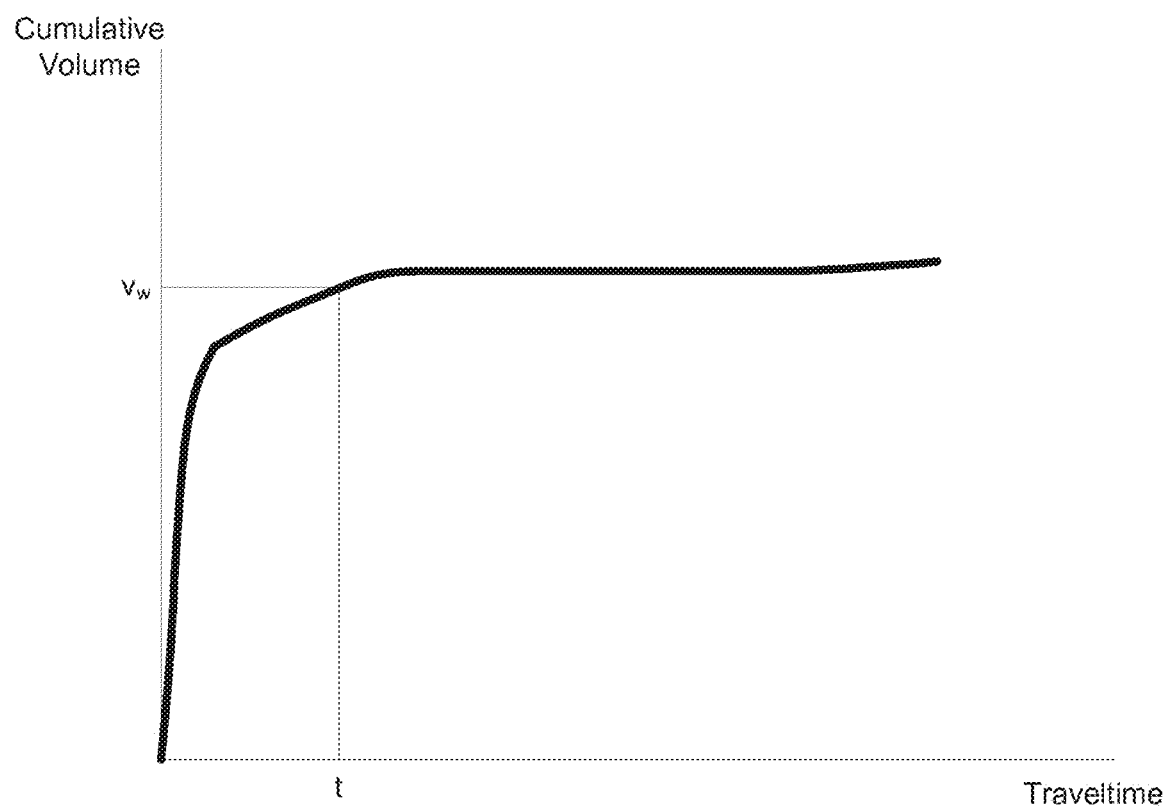
FIG. 3 is a plot of cumulative volume (on the y axis) against traveltime to source (on the x axis) for the discretized volume depicted in FIG. 2.

FIG. 3 is a graph of cumulative volume against traveltime for the described example, and computed using the fast marching algorithm and the slowness as defined previously. As can be seen, the plotted line raises sharply for very low traveltimes, this being the result of the cells assigned a very low slowness value. The line gradient becomes less steep, this being indicative of cells having travetimes resulting from the intermediate slowness value. As the very high slowness value was much greater than the other assigned slowness values, there is a large range of traveltimes over which the volume remains constant, until the remaining volume (those with the highest traveltimes) is encountered and the curve begins to rise again.

As the total injected volume $v_w$ is known, the graph can be used to find the corresponding traveltime t. This traveltime can then be used to define the geobody, such that the geobody boundary comprises those cells having traveltime t.

However, the injected water volume $v_w$ is equal to the product of the gross rock volume v, the net-to-gross NTG, the porosity $\Phi$ and the water saturation $s_w$. This can be taken into account as follows:

transfer the extracted geobody onto a reservoir grid to obtain the net-to-gross NTG, the porosity $\Phi$ and the water saturation $s_w$ values and recalculate the geobody;

use an average NTG, porosity and water saturation (possibly different for the two geobodies relating to subsurface volumes $v_1$ and $v_2$);

incorporate the net-to-gross NTG, the porosity $\Phi$ and the water saturation $s_w$ values into the transfer function.

The advantages of the methods disclosed herein are as follows:

It is computationally efficient,
It can automatically provide a body that is:
uniquely defined,
made of contiguous cells,
of desired total volume,
It allows the gradual factoring of the preference of locations close to the source for inclusion within the geobody.

It provides flexibility in the introduction of prior knowledge of any origin, in the form of 3D properties, into the body selection.

It allows the introduction of knowledge relative to preferential global or local expansion directions in addition to knowledge locations.

Once the geobodies are obtained they may be used for various purposes (for example):

1. Validation of the Geomodel (e.g.):

Geometry of the layers: Superimpose the geobodies on the reservoir grid to verify that all of the cells of the reservoir grid that are within the geobody are correctly identified as being part of the reservoir i.e. not shale (NTG=0).

Properties inside the cells: Recompute the swept volumes with actual properties of the reservoir grid cells included in the geobody to check that the water volume $v_w$ is still correctly approximated, and modify the geological parameters accordingly.

2. Use in Reservoir Management:

Monitoring whether the volumes and the geometry of the geobody correspond to what was planned, and if not, modifying an injection strategy relating to the manner of injection of an injection fluid used in a hydrocarbon recovery process. Modification of the injection strategy may comprise inter alias modifying where an injection fluid is injected, the injection fluid used, and/or the pressure and/or temperature of the injection fluid used.

One or more steps of the methods and concepts described herein may be embodied in the form of computer readable instructions for running on suitable computer apparatus, or in the form of a computer system comprising at least a storage means for storing program instructions embodying the concepts described herein and a processing unit for performing the instructions. As is conventional, the storage means may comprise a computer memory (of any sort), and/or disk drive, optical drive or similar. Such a computer system may also comprise a display unit and one or more input/output devices.

The concepts described herein find utility in all aspects (real time or otherwise) of surveillance, monitoring, optimisation and prediction of hydrocarbon reservoir and well systems, and may aid in, and form part of, methods for extracting hydrocarbons from such hydrocarbon reservoir and well systems.

It should be appreciated that the above description is for illustration only and other embodiments and variations may be envisaged without departing from the spirit and scope of the invention.

The invention claimed is:

1. A method of characterizing a subsurface discretized volume comprising a plurality of cells, the method comprising extracting a geobody from seismic data arranged within the discretized volume, the geobody comprising a subset of the plurality of cells, each cell of the subset having one or more properties indicative of a particular fluid phase, wherein the extracting comprises:

determining a propagation probability value for each cell indicative of the probability that a front propagates through the cell;

beginning from a source within the discretized volume, using the propagation probability value to calculate a traveltime for each cell, the traveltime describing the time the front takes to travel from the source point to the cell;

using the traveltimes to extract the one or more properties indicative of a particular fluid phase of the geobody from the seismic data; and using the extracted one or more properties indicative of a particular fluid phase of the geobody to aid hydrocarbon recovery from a reservoir comprising the discretized volume by:

monitoring whether the volume and geometry of the geobody corresponds to a planned geobody volume and planned geometry relating to a volume of an injection fluid injected during the hydrocarbon recovery; and modifying an injection strategy used in the hydrocarbon recovery if the geometry of the geobody does not correspond to the planned volume and geometry, wherein the modifying the injection strategy includes at least one of modifying where the injection fluid is injected, the injection fluid used, the temperature of the injection fluid, and the pressure of the injection fluid.

2. The method as claimed in claim 1 wherein the propagation probability value is used as a velocity or slowness for the front when calculating the traveltimes.

3. The method as claimed in claim 1 wherein a boundary of the geobody is defined by cells all having a single traveltime attributed thereto.

4. The method as claimed in claim 3 wherein the single traveltime is determined from the planned geobody volume.

5. The method as claimed in claim 4 wherein the planned geobody volume is based upon the volume of the injection fluid injected during hydrocarbon recovery.

6. The method as claimed in claim 4, wherein the planned geobody volume is based upon a known porous volume within the discretized volume.

7. The method as claimed in claim 1 wherein using the traveltimes to extract the geobody comprises:

sorting the cells in accordance with their traveltime; and
beginning with the cells having a shortest traveltime, cumulating a product of a cell volume and a cell volume fraction property until a target geobody volume is reached.

8. The method as claimed in claim 1, wherein the step of determining the propagation probability value for each cell comprises using a transfer function to transform an indicator property value indicative of the probability that a cell is included within the geobody.

9. The method as claimed in claim 8 wherein the transfer function is used to transform a plurality of combined indicator property values, each indicative of the probability that a cell is included within the geobody.

10. The method as claimed in claim 8 wherein the propagation probability value is anisotropic, the transfer function accounting for the anisotropy of the propagation of the front.

11. The method as claimed in claim 1, wherein the method uses a fast marching method to determine the propagation of the front.

12. The method as claimed in claim 1, wherein the discretized volume comprises one or more second sources in addition to said source and the traveltime describes a minimum time the front takes to travel to a cell from any source point to the cell.

13. The method as claimed in claim 1, wherein the source comprises one or more of a perforation, well and fluid contact.

14. A computer program comprising computer readable instructions which, when run on suitable computer apparatus, cause the computer apparatus to perform the method of claim 1.

15. A non-transitory computer program carrier comprising the computer program of claim 14.

16. An apparatus specifically adapted to carry out the steps of the method as claimed in claim 1.

* * * * *